United States Patent
Kalter et al.

(10) Patent No.: US 9,600,588 B1
(45) Date of Patent: Mar. 21, 2017

(54) STEMMING FOR SEARCHING

(71) Applicant: StoredIQ, Inc., Austin, TX (US)

(72) Inventors: William Kalter, Cedar Park, TX (US); Eric Scott, Austin, TX (US); Jozsef Szalay, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 78 days.

(21) Appl. No.: 13/788,570

(22) Filed: Mar. 7, 2013

(51) Int. Cl.
*G06F 17/30* (2006.01)

(52) U.S. Cl.
CPC .................. *G06F 17/3087* (2013.01)

(58) Field of Classification Search
CPC ......... G06F 17/30864; G06F 17/30631; G06F 17/30336; G06F 17/30448; G06F 17/30672; G06F 17/30613; G06F 17/30011; G06F 17/30389; G06F 17/3066; G06F 17/30675; G06F 17/30967
USPC .......... 707/E17.005, 999.003, E17.108, 740, 707/E17.064, 769, 999.202, 609, 706, 707/737, 802, 999.007, 999.1, E17.002, 707/E17.014, E17.058, E17.09, E17.109, 707/722, 742, 750, 758, 803, 955, 707/999.005, 999.01, 999.104, E17.001, 707/E17.007, E17.009, E17.017, 707/E17.045, E17.059, E17.075, 707/E17.083, E17.095, E17.104, E17.14, 707/600, 634, 642, 645, 646, 661, 662, 707/667, 668, 673, 674, 696, 708, 713, 707/715, 720, 723, 732, 736, 741, 746, 707/759, 765, 766, 767, 770, 781, 791, 707/809; 704/E19.001, E19.026, 214, 704/219, 230, E11.006, E15.001, 704/E19.003, E19.006, E19.027, 704/E19.032, E19.035, E19.036, 704/E19.039, E19.041, E19.042, 704/E19.046, E21.001, E21.009, 201, 704/207, 222, 225, 229, 235, 251, 254, 704/255; 709/201, 227
See application file for complete search history.

(56) References Cited

U.S. PATENT DOCUMENTS

| 7,610,329 B2 | 10/2009 | Bone et al. |
| 8,032,501 B2 | 10/2011 | Bone et al. |
| 8,086,553 B2 | 12/2011 | Bone et al. |
| 8,515,972 B1 * | 8/2013 | Srikrishna et al. ........... 707/750 |
| 8,612,404 B2 | 12/2013 | Bone et al. |

(Continued)

FOREIGN PATENT DOCUMENTS

WO    WO 03098483 A1 * 11/2003 ......... G06F 17/3053

*Primary Examiner* — Jay Morrison
*Assistant Examiner* — Ken Hoang
(74) *Attorney, Agent, or Firm* — Yeen Tham; Edell, Shapiro & Finnan, LLC (57) ABSTRACT

Embodiments of a search stemming module at a computer configured to receive a query and identify stems from the query and configured to search a secondary index for variants corresponding to the stems are disclosed. The secondary index may comprise one or more lists of stems associated with variants from a primary index; a search reconfiguration module configured to reformat the query to include variants found from the secondary index; and a search engine configured to implement a search of the primary index using the variants received from the search reconfiguration module.

12 Claims, 5 Drawing Sheets

(56) References Cited

U.S. PATENT DOCUMENTS

| | | | |
|---|---|---|---|
| 8,793,120 B1* | 7/2014 | Fliedner et al. | 704/9 |
| 8,898,101 B2 | 11/2014 | Bone et al. | |
| 2003/0078915 A1* | 4/2003 | chaudhuri | G06F 17/3033 |
| 2004/0044659 A1* | 3/2004 | Judd et al. | 707/3 |
| 2007/0055670 A1* | 3/2007 | Maycotte et al. | 707/10 |
| 2014/0172907 A1* | 6/2014 | Dubbels | G06F 17/30672 |
| | | | 707/769 |

* cited by examiner

STEMMING FOR SEARCHING

TECHNICAL FIELD

This disclosure relates generally to searching data storage resources. More specifically, this disclosure relates to embodiments of systems, methods, and apparatuses for efficiently implementing stemming for text indexing and searches.

BACKGROUND

Being able to find documents by entering one or more words related to their content is a feature that is readily available with search engines and in many applications today. Search engines typically work by comparing query terms received in a search query with an index of stored terms from documents in the data store.

More often than not, these engines or applications can determine the linguistic roots ("stems") of searched terms and match them up against the stems of indexed terms. One of the challenges of these applications is the extra storage and processing time of managing the stems and mapping them back to the original terms as they actually appear in documents.

The typical approach of handling stems is that the stems are injected into the text that is being indexed at the same logical position where the associated term resides. For example, if the text being indexed is "The quickest foxes could easily jump over lazy dogs," stems may be injected as follows: "The quickest<quick> foxes<fox> could<can> easily<easy> jump over lazy dogs<dog>." (The terms within the brackets represent the stems of the terms just in front of them.) It is easy to see that the same stem could be injected many times in when indexing a single document even in a single paragraph or sentence. Each of these instances of the stem has to be indexed and stored, adding to the storage space that the index occupies and to the processing time the indexing itself requires.

SUMMARY

A system for performing stem searches according to embodiments includes a search stemming module at a computer configured to receive a query and identify stems from the query and configured to search a secondary index for variants corresponding to the stems, the secondary index comprising one or more lists of stems associated with variants from a primary index; a search reconfiguration module configured to reformat the query to include variants found from the secondary index; and a search engine configured to implement a search of the primary index using the found variants received from the stemming module.

In some embodiments, to implement the search of the primary index, the search reconfiguration module is configured to generate a Boolean search using the variants. In some embodiments, the search engine is configured to perform the query using the Boolean search of variants.

In some embodiments, the system includes a stemming module configured to generate the secondary index, the secondary index comprising an ordered lookup table of stems and related terms. In some embodiments, the stemming module is configured to process documents for generating the secondary index by identifying stems from terms in the documents and, if a term is found whose stem is different than the term, adding the stem with the term to the table if the stem has not already been added and, if the stem has been added but the term has not, adding the term. In some embodiments, the secondary index includes only a single instance of each stem and term.

A computer-implemented method according to some embodiments includes receiving a query at a computer and identifying stems from the query; searching a secondary index for variants corresponding to the stems, the secondary index comprising one or more lists of stems associated with variants from a primary index; reformatting the query to include variants found from the secondary index; implementing a search of the primary index using the variants; and accessing documents from a document store via a network corresponding to results of the search of the primary index.

In some embodiments, the method further comprises implementing the search of the primary index by generating a Boolean search using the variants.

In some embodiments, the method further includes generating the secondary index, the secondary index comprising an ordered lookup table of stems and variants. In some embodiments, the method further includes processing documents and generating the secondary index by identifying stems from terms in the documents and, if a term is found whose stem is different than the term, adding the stem with the term to the table if the stem has not already been added and, if the stem has been added but the term has not, adding the term. In some embodiments, the secondary index includes only a single instance of each stem and term.

Additional objects and advantages will become apparent to one skilled in the art upon reading and understanding exemplary embodiments described herein with reference to the following drawings.

BRIEF DESCRIPTION OF THE DRAWINGS

For a more complete understanding of the present disclosure and the advantages thereof, reference is now made to the following description taken in conjunction with the accompanying drawings in which like reference numerals indicate like features and wherein.

DETAILED DESCRIPTION

The disclosure and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the disclosure in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example", "for instance", "e.g.", "in one embodiment".

Embodiments can be implemented in a computer communicatively coupled to a network (for example, the Internet), another computer, or in a standalone computer. As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylist, etc.), or the like. In some embodiments, the computer has access to at least one database, which may local or accessed over the network.

ROM, RAM, and HD are computer memories for storing computer-executable instructions executable by the CPU or capable of being complied or interpreted to be executable by the CPU. Within this disclosure, the term "computer readable medium" or is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a DASD array, magnetic tape, floppy diskette, optical storage device, or other appropriate computer-readable medium or storage device.

In one exemplary embodiment, the computer-executable instructions may be lines of C++, Java, HTML, or any other programming or scripting code. Other software/hardware/network architectures may be used. For example, the functions described herein may be implemented on one computer or shared among two or more computers. In one embodiment, the functions may be distributed in the network. Communications between computers implementing embodiments can be accomplished using any electronic, optical, ratio frequency signals, or other suitable methods and tools of communication in compliance with known network protocols.

Moving on, embodiments disclosed herein can comprise systems and methods for improved searching and indexing. Turning now to the drawings and, with particular attention to FIG. 1, a diagram illustrating one embodiment of a search system is shown and generally identified by the reference numeral 100. In the embodiment illustrated, a data network 102 (e.g., a LAN, a WAN, the Internet, a wireless network or other network known in the art) communicatively couples an indexing system 104, an index store 106, a search system 108, a document repository 110, and one or more user devices 112.

Figure 1:
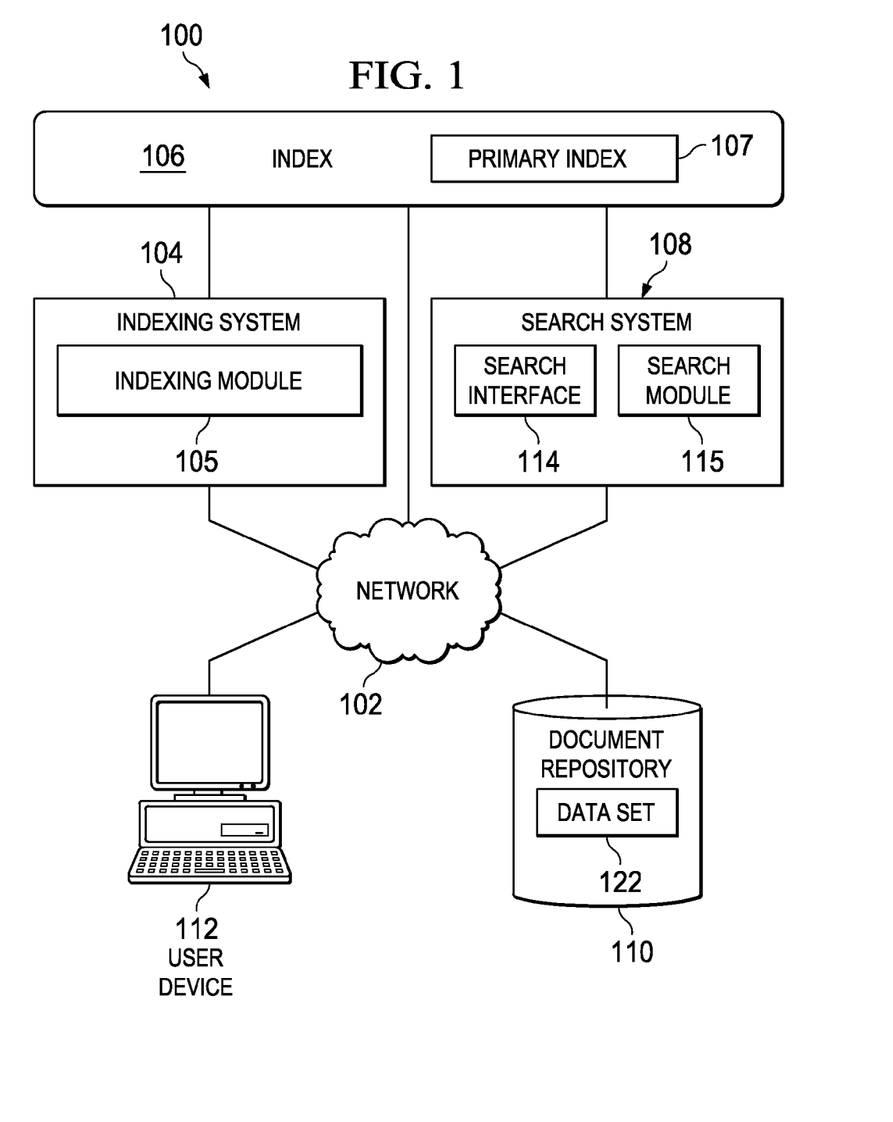
FIG. 1 illustrates an exemplary network system.

The document repository 110 stores one or more data sets 122 of documents of interest. Documents may include any files containing text, and may be in any public or proprietary formats. Exemplary text formats include WORD, PDF, RTF, TXT, XML, HTML or other formats.

The indexing system 104 employs an indexing module 105 for indexing documents in the document repository 110 to create a primary index 107 in the index store 106. In general, the indexing system 104 processes documents from the document repository 110, extracting terms from each document and adding them to the primary index 107. The primary index 107 comprises one or more lists of terms, each term associated with each of the documents in the data set 122 in which it appears. For example, the term may be associated with one or more document identifications or IDs. Other information may also be associated with the primary index 107, such as where in each document the term appears and frequency of appearance, etc.

Thus, in certain embodiments the primary index 107 may comprise a list of terms. Each instance of the occurrence of a term in a document may be associated with the term in the primary index 107. For example, an identifier of the document and the location of the occurrence in that document may be associated with the term for each instance of the occurrence of the term.

To generate the primary index 107, the documents in a data set 122 are processed (e.g., by text extraction and a tokenizer or the like) to generate the terms of a document. Indexing module 105 receives these terms and determines if a term should be indexed. If indexing module 105 determines that the term should be indexed, the indexing module 105 checks to see if it that term is present in primary index 107. If not, it is entered in the primary index 107 and the associated information related to the occurrence of that term (such as document ID, placement within the document, etc.) in the document in which it appears is also entered.

The primary index 107 may be arranged in any suitable manner, such as an ordered list or table. The primary index 107 may be arranged, for example, in alphabetical order by terms or alphanumerically by document ID. Such an arrangement may aid or speed access or searching of primary index 107.

The search system 108 includes a search interface 114 for receiving queries from users at user devices 112 over the network 102, and a search module 115 implementing a search engine for executing searches of the documents 122 using primary index 107. The user devices 112 may be implemented as any suitable devices for communicating over the network 102, such as personal or laptop computers, cellular telephones, smartphones, and the like.

Thus, to perform a search related to documents in data set 122, a user at user device 112 uses search interface 114 to input a query including one or more search terms which are received at the search system 108 via a search interface 114. The search module 115 receives the search terms and interacts with the primary index 107 to find a set of documents responsive to the search.

A difficulty can arise, however, because words can have many non-identical variants. For example, TRAIN, TRAINING, TRAINS, etc. A user might input TRAINING, but may also want to find documents that include TRAIN and other variants. To allow for searching using variants of a search term, when documents are indexed, the stems (if any) of a term to be indexed may be determined and associated with the term in the index. When a user enters a query, the query can be analyzed to determine the "stem" of the search terms (if any). The search can be performed using both the stems of the search terms and the stems contained in the primary index 107. As can be seen, this approach requires that during an indexing process, the stems of terms are stored in the primary index along with the term itself. For example, if the text being indexed is "The quickest foxes could easily jump over lazy dogs," stems may be injected as follows: "The quickest<quick> foxes<fox> could<can> easily<easy> jump over lazy dogs<dog>." (The terms within the brackets represent the stems of the terms just in front of them.)

As discussed above, however, each occurrence of a term in every document may be stored in the primary index 107. Thus, for each occurrence of a term in every document the stem of that term may similarly be stored in the primary index 107. Not only does this approach greatly expand the storage required to store the primary index 107, then, but it may also add significant processing time to both the indexing and searching processes. The impact to the processing of a query may be especially problematic as it directly affects the time a user must wait between the user's entering of the query and the time results of the query are returned to the user.

What is desired then, are systems and methods which allow the use of stemming which reduce the processing time associated with the implementation of stemming, and in particular may reduce the processing time required when processing and returning results to a query. To that end, attention is now directed to the embodiments of systems and methods for stemming for text indexing and searching presented herein.

Specifically, an indexing process according to embodiments creates a secondary index for stems and their associated variants. More particularly, in certain embodiments during the indexing of documents, the stem of terms being indexed (if any) can be determined. For a stem it can be determined if that stem is in the secondary index. If the stem is not found in the secondary index, the stem may be added to the secondary index and the term associated with the stem (if it is different). If it is determined that the stem is already stored, but the original term is not in the set of associated variants of that stem, the original term is added to the set of variants.

During a search then, the search terms of the query themselves are processed to determine their stems (if any). Using the secondary index, the set of variants associated with each stem of each search term can be determined. The original query is then reformulated to include the variations of those stems.

Thus, according to some embodiments, a stem and its associated variant is stored in the secondary index only once and only for those stems and variants that the process actually encountered during indexing of the documents to be searched, thus significantly reducing the time and storage required to maintain and process the secondary index. Further, in some embodiments, the metadata is stored in the primary index only and not duplicated in the secondary index. Advantageously, the indexing process requires relatively less storage than previous methods and, importantly, can have advantageous effects on query processing time, as well.

Figure 2A:
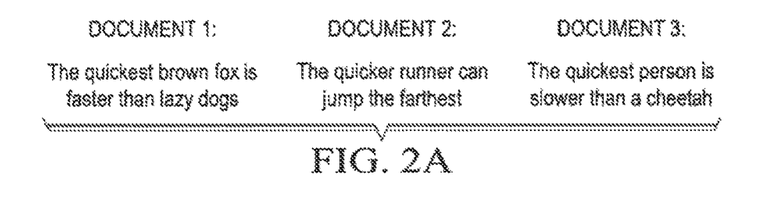
FIG. 2A and FIG. 2B illustrate operation of embodiments by way of example.
Figure 2B:
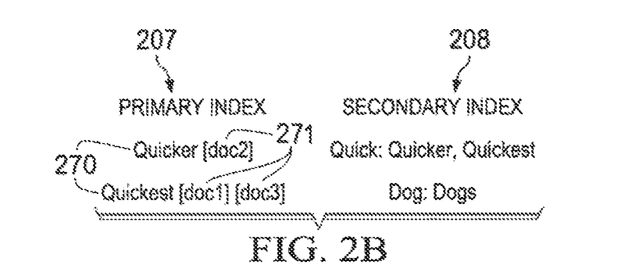

FIG. 2A and FIG. 2B illustrate operation of embodiments by way of example. Shown in FIG. 2A are three exemplary documents. Document 1 contains the text "The quickest brown fox is faster than lazy dogs." Document 2 contains the text "The quicker runner can jump the farthest." Document 3 contains the text "The quickest person is slower than a cheetah." It is noted that, typically, documents can contain more than a single sentence and many more terms. Thus, the figure is exemplary only.

A process for stemming identifies terms from the documents and provides them to a primary index 207, as shown in FIG. 2B. In the example illustrated, the terms "quicker" and "quickest" have been indexed in the primary index 207. In addition to the terms 270, additional metadata or indexing information 271 is provided. Such information may include the documents in which the terms are found, etc.

In addition, the stemming process identifies the stems of terms and stores them in the secondary index 208. For example, the stemming process may identify "quick" as the stem of "quicker" and "quickest." The secondary index 208 stores the stem "quick" as well as the instances of the associated variants "quicker" and "quickest." Similarly, "dog" may be identified as the stem of "dogs." Other terms are handled in a like manner.

As will be explained in greater detail below, when a search is input, the search process reformulates the query to include the stem and its variants. For instance, the search for "quicker" may first identify the stem "quick" and then search the secondary index 208 for that stem. In the example illustrated, this may include "quicker" and "quickest." The search query may then be reformulated as "quick OR quicker OR quickest". This reformulated search may then be performed on the primary index 207 and documents responsive to the reformulated search returned to the user.

Figure 3:
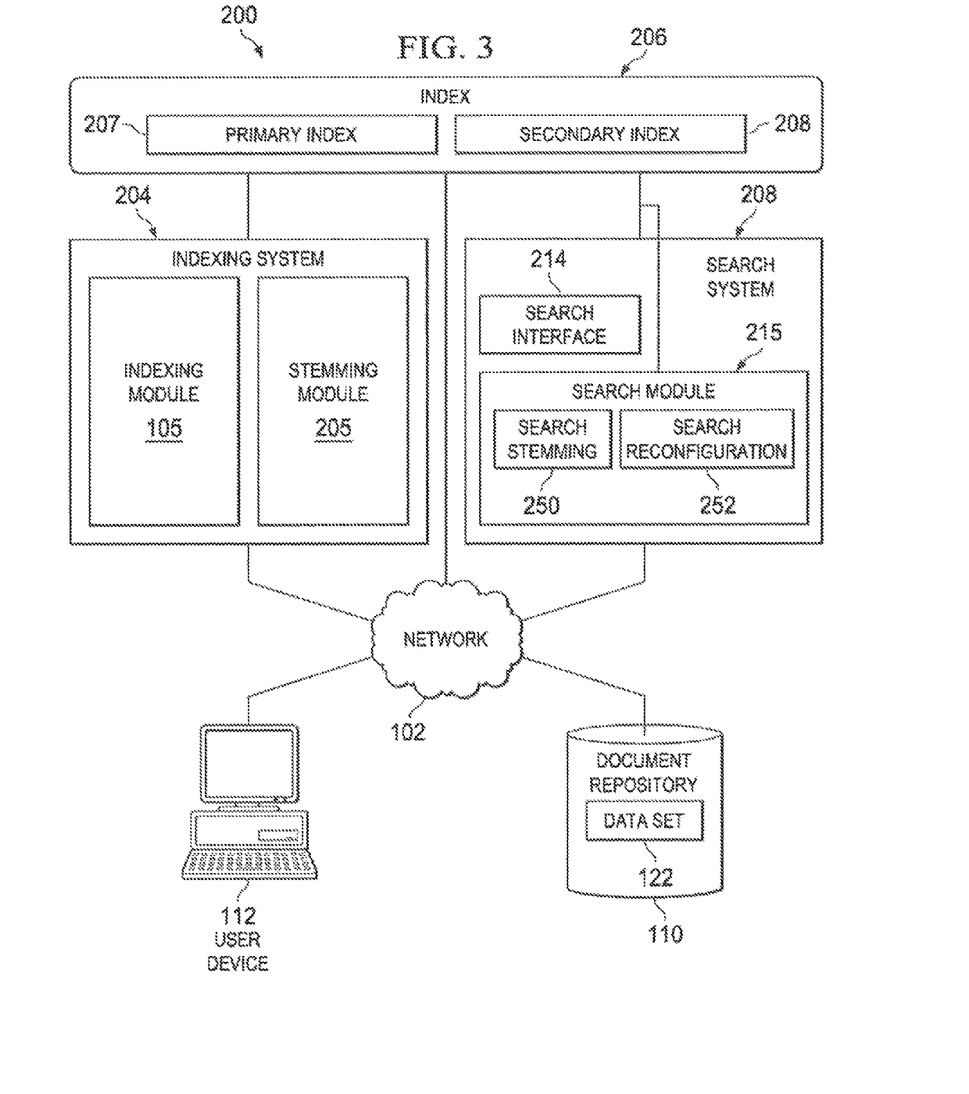
FIG. 3 illustrates an exemplary network system in which embodiments may be implemented.

Turning now to FIG. 3, a diagram illustrating an exemplary search system is shown and generally identified by the reference numeral 200. In the embodiment illustrated, a data network 102 (e.g., a LAN, a WAN, the Internet, a wireless network or other network known in the art) communicatively couples an indexing system 204, an index store 206, a search system 208, a document repository 110, and one or more user devices 112.

As discussed above, the indexing system 204 employs an indexing module 105 for indexing documents in the document repository 110 to create a primary index 207 in the index store 206. The primary index 207 comprises one or more lists of terms, each term associated with each of the documents in the data set 122 in which it appears. For example, the term may be associated with one or more document identifications or IDs. Other information may also be associated with the primary index 207, such as where in each document the term appears and frequency of appearance, etc.

Thus, in certain embodiments the primary index 207 may comprise a list of terms. Each instance of the occurrence of a term in a document may be associated with the term in the primary index 207. For example, an identifier of the document and the location of the occurrence in that document may be associated with the term for each instance of the occurrence of the term.

The index store 206 further maintains a secondary index 208. The secondary index 208 may comprise lists of stems and, for each stem, a set of associated variants. The secondary index 208 may be ordered, for example, alphabetically by stem, for increased efficiency of searching.

In addition, the indexing system 204 includes a stemming module 205 for populating the secondary index 208. The stemming module 205 receives terms that are to be indexed in the primary index 207 from the indexing module 105 and determines, for each received term, if that term has a stem. This determination may be made according to a wide variety of methods such as by accessing a stemming algorithm, thesaurus or dictionary. If the term has a stem, then the secondary index 208 is accessed to determine if the term or its stem are present in the secondary index 208. If the stem is not present in the secondary index 208 then the stem is added to the secondary index 208 and the term is added to the secondary index 208 as a variant of the stem (if the stem and term are different). If the stem is present in the secondary index 208 but the term is not in the set of variants associated with the stem, then the term is added to the secondary index 208 as a variant of the stem.

The search system 208 includes a search interface 214 for receiving queries from users at user device 112 over the network 102, and a search module 215 implementing a search engine for executing searches of documents 122 using the primary index 207 or secondary index 208. The search module 215 further includes a search stemming module 250 and a search reconfiguration module 252.

The search stemming module 250 receives queries from the search interface 214 and analyzes them to determine if a query includes search terms with stems. This determination may be similar to that undertaken by the stemming module 205 during the indexing process. Thus, for each query term of the query the search stemming module 250 may determine if that query term has a stem. Once a stem for a query term is determined, the set of variants of that query term may be determined by accessing the secondary index 208 and determining the set of variants associated with the stem of that query term in the secondary index 208. If variants of the stem are found, then the stem and the variants (and the original query term if different than the stem and the set of variants) are used by the search reconfiguration module 252 to reformulate the query based on the set of variants for each of the query terms for which a set of variants was determined. The reformulated query can then be used in searching documents 122 using the primary index 207.

For example, for each query term for which a set of variants was determined, the query may be reformulated to include the original term, the stem, and all variants obtained from the secondary index. In some embodiments, the query may be reformulated with a Boolean expression instead of the original query term, where the Boolean expression includes the original query term, the stem of the query term and the set of variants determined for the query term. For example, such a Boolean expression may be of the form "term OR stem OR variant1 OR variant2 OR variant3 OR . . . " The reformulated query can then be used to search the documents 122 using the primary index 207, as described above.

Figure 4:
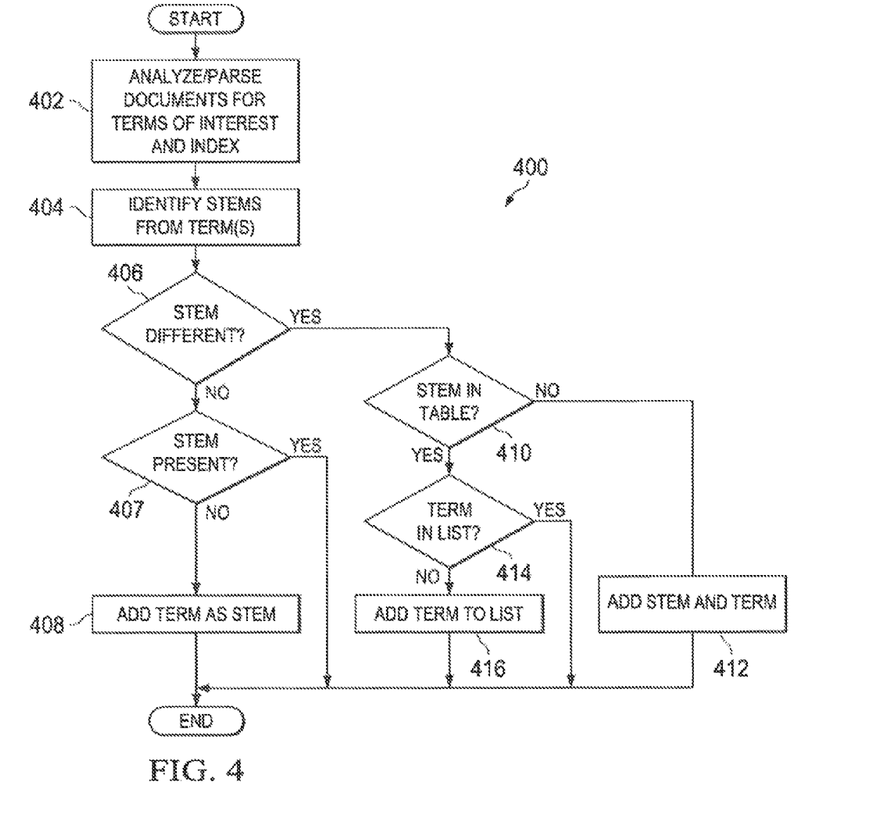
FIG. 4 is a flowchart illustrating operation of embodiments.

FIG. 4 is a flowchart illustrating a process for creating a secondary index in accordance with embodiments. According to some embodiments, the indexing module 105 receives or generates the primary index 207 by parsing or extracting terms of interest (step 402). In some embodiments, the primary index 207 identifies the documents the terms appear in and, for example, the placement within the document and other associated metadata.

Next, the stemming module 205 processes each term by identifying stems and related terms for each index term (step 404). If the stem is different from the term (step 406), the stemming module 205 will check to see if the stem is already in the secondary index 208 (step 410). If it is not, then the stem and the term will be added (step 412).

If the stem is already in the secondary index 208, then the stemming module 205 will determine if the associated term is in the secondary index associated with the stem (step 414). If it was not, then it will be added to the secondary index 208 in association with the stem (step 416).

If, back in step 406, the stem was the same as the term, then the stem/term will be added to the secondary index 208 as a stem (step 408) if it is not already present (step 407).

In some embodiments, the process continues until all documents of interest are processed. Thus, terms of interest are extracted and added to the secondary index in association with the stems. It is noted that, in some embodiments, each stem and its associated terms is listed only once. In this way, duplication of storage is avoided.

Figure 5:
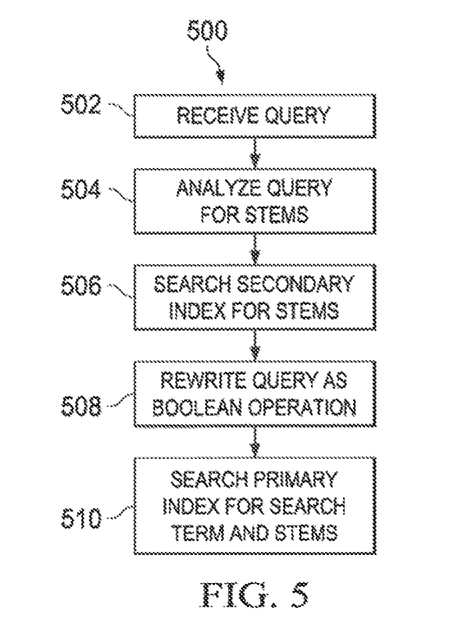
FIG. 5 is a flowchart illustrating operation of embodiments.

Operation of an embodiment is illustrated with reference to the flowchart of FIG. 5. A query is received from a user device 112 over the network 102 at the search interface 214 (step 502). The search interface 214 provides the query to the search module 215, whose search stemming module 250 will analyze the query for stems (step 504), If stems are identified, then the search stemming module 250 will search the secondary index 208 for stems (step 506).

If stems and variants are found, then the search reconfiguration module 252 will rewrite the query using a Boolean search including the variants found (step 508). Finally, the search module 215 will execute the search (step 510) on the primary index and return a list of documents to the user.

While it should be noted that embodiments as described and claimed may be utilized in almost any document search system, it may be helpful here to give one example of an architecture where such embodiments may be useful. In particular, certain embodiments may be especially useful for implementing stemming in conjunction with a search or indexing function in a network or file system management environment.

Figure 6:
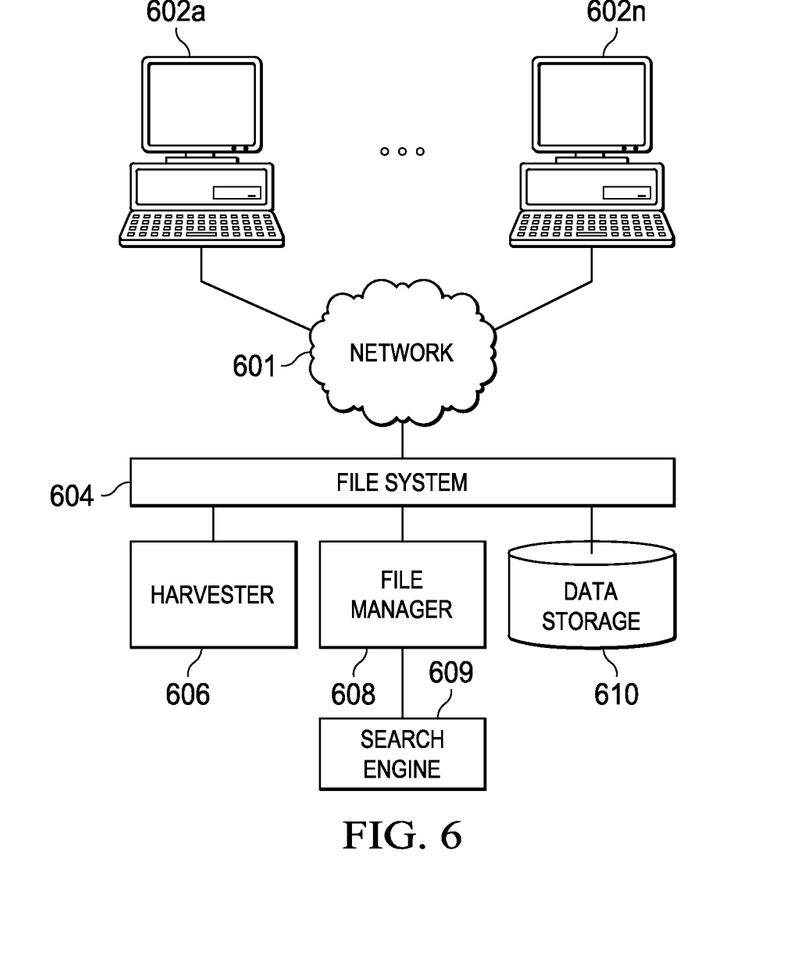
FIG. 6 illustrates an exemplary network environment in which embodiments may be implemented.

FIG. 6 is a diagrammatic representation of a network system in which file system management and index searching can be implemented according to embodiments disclosed herein. A data network 601 (e.g., a LAN, a WAN, the Internet, a wireless network or other network known in the art) connects a number of computers 602a-602n and a file system 604. One or more of the computers 602a-602n may be, for example, personal computers, tablet computers, laptop computer, workstations or other devices capable of communicating over or sharing data via the network 601. In addition, or alternatively, one or more of the computers 602a-602n may be servers connected to one or more storage devices (e.g., hard drives, tape drives, disk drives or other storage media device known in the art) whose content may be shared out over network 601 according to a network file system protocol.

The file system 604 may be implemented as a server and may include or be coupled with a harvester 606, a search engine 609, a file system manager 608, and data storage 610. The harvester 606 may be configured to "harvest" file data or metadata from computers and/or servers of interest on network 601 and store them in data storage 610 (e.g. as a data set of documents), Harvested file data or metadata may be used to build one or more indices suitable for use in a stem searching system according to embodiments, Metadata may comprise, for example, a file name, some explicit/static information such as its owner, size, and so on, its contents or data, and an arbitrary and open set of implicit or "dynamic" metadata such as the tiles content type, checksum, and so on. Data storage 610 may further store primary and secondary indices, as described above. Accordingly, the file data or metadata harvested from one or more file systems 604 by harvester 606 and stored in data storage 610 may be efficiently searched using stemming using embodiments of the systems and methods presented herein.

Further details of an exemplary harvesting and file management system may be found in commonly-assigned, co-pending U.S. patent application Ser. No. 12/572,116, filed Oct. 1, 2009, entitled "METHOD AND APPARATUS FOR HARVESTING FILE SYSTEM METADATA," Which is hereby incorporated by reference in its entirety as if fully set forth herein. Exemplary systems and methods for managing file systems may be found in commonly-assigned U.S. Pat. No. 7,610,329, U.S. Pat. No. 8,032,501, U.S. Pat. No. 8,086,553, and commonly-assigned and co-pending U.S. patent application Ser. No. 13/301,503, all titled "Method and Apparatus for Managing File Systems and File-Based Data," and all of which are hereby incorporated by reference in their entireties as if fully set forth herein.

Although the present disclosure has been described and illustrated in detail, it should be understood that the embodiments and drawings are not meant to be limiting. Various alterations and modifications are possible without departing from the spirit and scope of the disclosure. Accordingly, the scope of the disclosure should be determined by the following claims and their legal equivalents.

What is claimed is:

1. A system for performing stem searches on a set of documents, comprising:
   a processor comprising:
      an indexing module configured to extract terms from the set of documents and create a primary index including each of the extracted terms for searching the set of documents wherein the primary index comprises an inverted index;
      a stemming module configured to generate a secondary index from the extracted terms for searching the primary index, wherein the secondary index includes each stem of the extracted terms and each corresponding variant of that stem within the extracted terms from the set of documents that is different than the stem, wherein the secondary index comprises an ordered lookup table of stems and variants, and wherein the stemming module is further configured to generate the secondary index by identifying stems from the extracted terms and, if a term is found whose stem is different than the term, adding the stem with the term to the table if the stem has not already been added and, if the stem has been added but the term has not, adding the term;
      a search stemming module configured to receive a query for the set of documents and identify stems of terms from the query and to search the secondary index for a plurality of variants corresponding to the stems of the terms from the query, wherein the plurality of variants found in the search is different than the stems from the terms in the query;
      a search reconfiguration module configured to reformat the query to include a plurality of additional query terms comprising the plurality of variants found from the secondary index, wherein, for each term of the query having a variant in the secondary index, the reformatted query includes the term, the identified stem of the term, and each corresponding variant for the identified stem of the term found from the secondary index; and
      a search engine configured to implement a search of the primary index using the reformatted query received from the search reconfiguration module to identify a resulting set of documents.

2. A system according to claim 1, wherein, to implement the search of the primary index, the search reconfiguration module is configured to generate a Boolean search using the variants.

3. A system according to claim 2, wherein the search engine is configured to perform the reformatted query using the Boolean search of variants.

4. A system according to claim 1, wherein the secondary index includes only a single instance of each stem and term.

5. A computer program product comprising one or more computer readable storage devices storing instructions translatable by one or more processors to perform:
   extracting terms from a set of documents and creating a primary index including each of the extracted terms for searching the set of documents, wherein the primary index comprises an inverted index;
   generating a secondary index from the extracted terms for searching the primary index, wherein the secondary index includes each stem of the extracted terms and each corresponding variant of that stem within the extracted terms from the set of documents that is different than the stem, wherein the secondary index comprises an ordered lookup table of stems and variants, and wherein generating the secondary index comprises identifying stems from the extracted terms and, if a term is found whose stem is different than the term, adding the stem with the term to the table if the stem has not already been added and, if the stem has been added but the term has not, adding the term;
   receiving a query for the set of documents and identifying stems of terms from the query;
   searching the secondary index for a plurality of variants corresponding to the stems of the terms from the query, wherein the plurality of variants found in the search is different than the stems from the terms in the query;
   reformatting the query to include a plurality of additional query terms comprising the plurality of variants found from the secondary index, wherein, for each term of the query having a variant in the secondary index, the reformatted query includes the term, the identified stem of the term, and each corresponding variant for the identified stem of the term found from the secondary index; and
   implementing a search of the primary index using the reformatted query to identify a resulting set of documents.

6. A computer program product according to claim 5, wherein the one or more computer readable storage devices storing instructions translatable by one or more processors are further configured to perform implementing the search of the primary index by generating a Boolean search using the variants.

7. A computer program product according to claim 6, wherein implementing the search of the primary index further comprises performing the reformatted query using the Boolean search of variants.

8. A computer program product according to claim 5, wherein the secondary index includes only a single instance of each stem and term.

9. A computer-implemented method, comprising:
extracting terms from a set of documents and creating a primary index including each of the extracted terms for searching the set of documents, wherein the primary index comprises an inverted index;
generating a secondary index from the extracted terms for searching the primary index, wherein the secondary index includes each stem of the extracted terms and each corresponding variant of that stem within the extracted terms from the set of documents that is different than the stem, wherein the secondary index comprises an ordered lookup table of stems and variants, and wherein generating the secondary index comprises identifying stems from the extracted terms and, if a term is found whose stem is different than the term, adding the stem with the term to the table if the stem has not already been added and, if the stem has been added but the term has not, adding the term;
receiving a query for the set of documents and identifying stems of terms from the query;
searching the secondary index for a plurality of variants corresponding to the stems of the terms from the query, wherein the plurality of variants found in the search is different than the stems from the terms in the query;
reformatting the query to include a plurality of additional query terms comprising the plurality of variants found from the secondary index, wherein, for each term of the query having a variant in the secondary index, the reformatted query includes the term, the identified stem of the term, and each corresponding variant for the identified stem of the term found from the secondary index;
implementing a search of the primary index using the reformatted query to identify a resulting set of documents; and
accessing the resulting set of documents from a document store via a network corresponding to results of the search of the primary index.

10. A computer-implemented method according to claim 9, further including implementing the search of the primary index by generating a Boolean search using the variants.

11. A computer-implemented method according to claim 9, wherein the secondary index includes only a single instance of each stem and term.

12. A computer-implemented method according to claim 10, wherein implementing the search of the primary index further comprises performing the reformatted query using the Boolean search of variants.

* * * * *